(12) United States Patent
Cui et al.

(10) Patent No.: US 12,105,774 B2
(45) Date of Patent: Oct. 1, 2024

(54) METHOD FOR GENERATING TRAFFIC DEMAND DATA OF DATA CENTER NETWORK

(71) Applicant: TSINGHUA UNIVERSITY, Beijing (CN)

(72) Inventors: Yong Cui, Beijing (CN); Zhiwen Liu, Beijing (CN); Mowei Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/309,222

(22) Filed: Apr. 28, 2023

(65) Prior Publication Data

US 2023/0421468 A1 Dec. 28, 2023

(30) Foreign Application Priority Data

Jun. 28, 2022 (CN) .......................... 202210742776.5

(51) Int. Cl.
*G06F 18/2413* (2023.01)
*G06F 40/216* (2020.01)
(Continued)

(52) U.S. Cl.
CPC ...... *G06F 18/24133* (2023.01); *G06F 40/216* (2020.01); *G06Q 10/10* (2013.01);
(Continued)

(58) Field of Classification Search
CPC .. G06F 18/24133; G06F 18/23; G06F 18/214; G06F 40/30; G06F 40/216; G06F 18/2411; G06F 17/10; G06Q 20/4016; G06Q 20/409; G06Q 10/10; G06Q 40/08; G06Q 50/40; G06Q 30/0185; G06N 7/01; G06N 20/20; G06N 3/088; G06N 20/10; H04L 67/535

See application file for complete search history.

(56) References Cited

U.S. PATENT DOCUMENTS

2014/0058763 A1* 2/2014 Zizzamia ............... G06Q 10/10
  705/4
2022/0114593 A1* 4/2022 Johnson ............ G06F 18/24133

FOREIGN PATENT DOCUMENTS

CN 108874768 A * 11/2018 .......... G06F 40/216
KR 102202842 B1 * 1/2021

* cited by examiner

*Primary Examiner* — Kyung H Shin
(74) *Attorney, Agent, or Firm* — Hodgson Russ LLP

(57) ABSTRACT

A method for generating traffic demand data of a data center network includes: acquiring traffic demand samples each including a source address, a destination address, a flow interval, and a flow size; acquiring a first interval number by performing equal-frequency binning discretization processing according to the flow interval and acquiring a second interval number by performing equal-frequency binning discretization processing according to the flow size; determining a traffic demand subset according to the source address and the destination address, and acquiring a first parameter matrix and a second parameter matrix by training a latent Dirichlet allocation probability topic model according to the traffic demand subset; and generating the traffic demand data according to the first interval number, the second interval number, the first parameter matrix, and the second parameter matrix.

19 Claims, 1 Drawing Sheet

(51) Int. Cl.
*G06Q 10/10* (2023.01)
*H04L 43/067* (2022.01)
*H04L 43/0882* (2022.01)
*H04L 43/16* (2022.01)

(52) U.S. Cl.
CPC ........ *H04L 43/067* (2013.01); *H04L 43/0882* (2013.01); *H04L 43/16* (2013.01)

METHOD FOR GENERATING TRAFFIC DEMAND DATA OF DATA CENTER NETWORK

CROSS-REFERENCE TO RELATED APPLICATION

This application claims priority to Chinese Patent Application Serial No. 202210742776.5, filed Jun. 28, 2022, the entire disclosure of which is incorporated herein by reference.

FIELD

The present disclosure relates to the field of data center network traffic modeling technology, in particular to a method and an apparatus for generating traffic demand data of a data center network.

BACKGROUND

In the contemporary society, data centers and data center networks are the common network infrastructures, and data center networks carry more and more upper-layer applications. At the demand side, the traffic demand of upper-layer services is rapidly increased, and the requirements on performances such as time delay and bandwidth of the data center network are high. At the supply side, in order to meet the service requirements, the data center network gradually upgrades hardware, performs topology optimization and transport mechanism optimization. Accurate modeling of traffic demand characteristics is the basis for evaluating and optimizing network architecture and transmission mechanism. At the design level, for example in a design for load balancing policy, characteristics of different traffic demand matrices and flow levels may have an influence on the design of the load balancing policy. In addition, at the evaluation level, traffic demands of different services may be generated through traffic model(s), a generated traffic may be used as input of a simulation environment, and thus the performances exhibited by different network architectures or different transmission mechanisms under different traffic conditions can be compared.

The traffic demand distribution in the data center network has heterogeneous, multidimensional locality characteristics that are related to the upper-layer traffic carried by the data center. Statistically, there is a significant difference in the total traffic demands of different source-destination addresses, and there is also a significant difference in the number of connections at different server nodes. According to the flow-by-flow level analysis, heterogeneity exists in the flow arrival behavior patterns for different source-destination addresses. In summary, the characteristics of the traffic demand distribution in the data center network are mainly reflected in four attributes of a source address, a destination address, a flow interval and a flow size.

In the related art, data center network traffic models are all based on assumptions: assuming a spatial distribution of all-to-all or many-to-one pattern, assuming that the flow interval obeys the Poisson distribution, and sampling the flow size independently from a global flow interval cumulative distribution function. These traffic models are reasonable to a certain extent, for example, the spatial distribution of the all-to-all pattern represents the worst case of data center network topology design, but such traffic models cannot be used to simulate and generate traffic demand data in the real data center service scenario.

SUMMARY

In a first aspect, embodiments of the present disclosure provide a method for generating traffic demand data of a data center network, including:
  acquiring traffic demand samples, the traffic demand sample including a source address, a destination address, a flow interval, and a flow size;
  acquiring a first interval number by performing equal-frequency binning discretization processing according to the flow interval, and acquiring a second interval number by performing equal-frequency binning discretization processing according to the flow size;
  determining a traffic demand subset according to the source address and the destination address, and acquiring a first parameter matrix and a second parameter matrix by training a latent Dirichlet allocation (LDA) probability topic model according to the traffic demand subset, in which the first parameter matrix is a high-dimensional feature probability distribution matrix from the source address to the destination address, and the second parameter matrix is a joint probability distribution matrix from a high-dimensional feature to the flow interval and the flow size; and
  generating the traffic demand data according to the first interval number, the second interval number, the first parameter matrix, and the second parameter matrix.

In a second aspect, embodiments of the present disclosure provide an electronic device including a processor; and a memory for storing instructions executable by the processor. The processor is configured to execute the instructions to perform the method described above in the first aspect.

In a third aspect, embodiments of the present disclosure provide a non-transitory computer-readable storage medium having stored therein a computer program that, when executed by a processor, causes the processor to implement the method described above in the first aspect.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

It should be noted that, in the case of no conflict, embodiments and features in the embodiments in the present disclosure can be combined with each other. Reference will be made in detail to embodiments of the present disclosure by combining the drawings.

In order to enable those skilled in the art to understand the technical solutions of the present disclosure, reference will be made clearly and completely technical solutions in the embodiments of the present disclosure with accompanying drawings. The embodiments described here are only part of the embodiments of the present disclosure and are not all embodiments of the present disclosure. Based on the embodiments of the present disclosure, other embodiments acquired by those skilled in the art without creative work are within the scope of the present disclosure.

Hereinafter, a method and an apparatus for generating traffic demand data of a data center network according to the embodiments of the present disclosure will be described with reference to the accompanying drawings. First, the method for generating traffic demand data of a data center network according to the embodiments of the present disclosure will be described with reference to the accompanying drawing.

Figure 1:
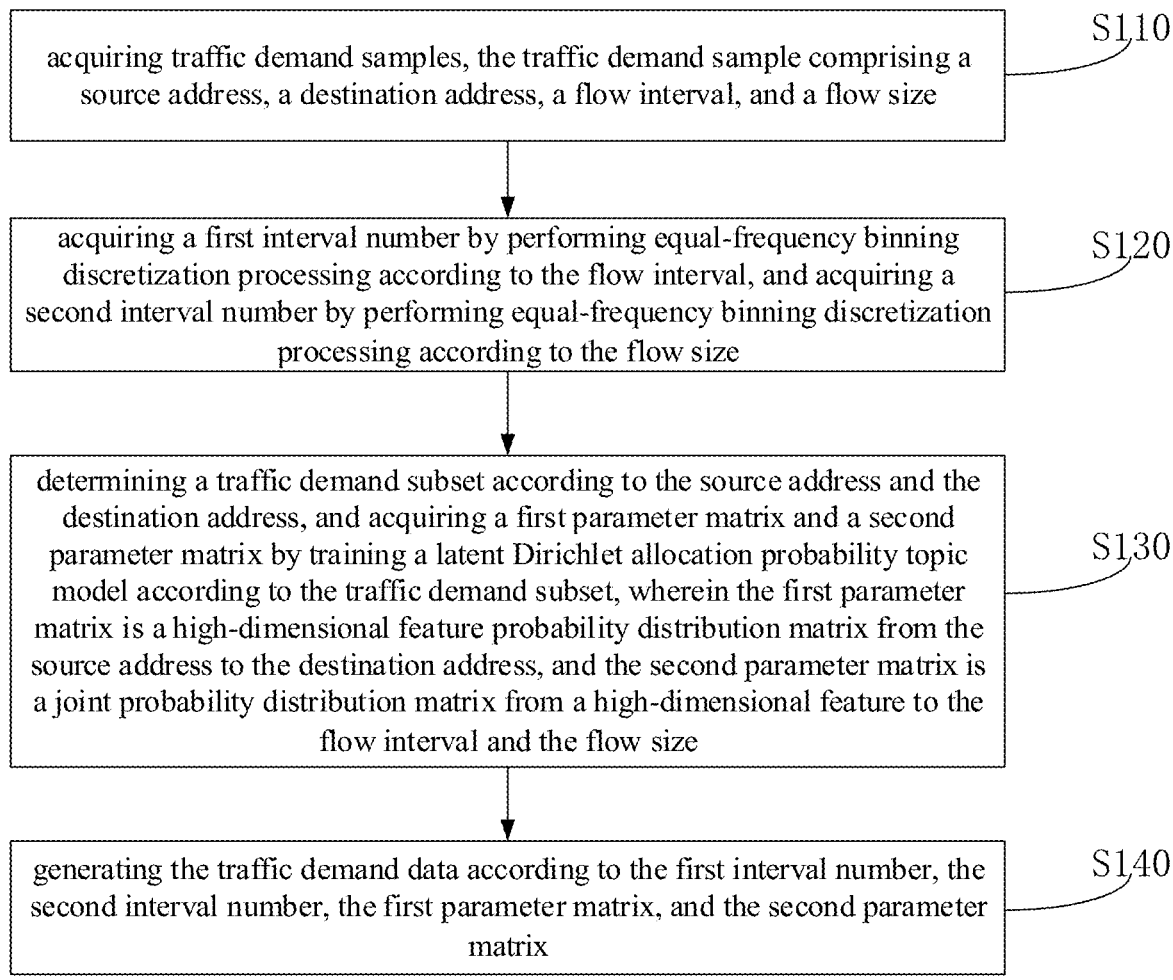
FIG. 1 is a flow chart of a method for generating traffic demand data of a data center network according to embodiments of the present disclosure.

FIG. 1 is a flow chart of a method for generating traffic demand data of a data center network according to embodiments of the present disclosure.

As shown in FIG. 1, the method for generating the traffic demand data of the data center network includes the following operations in blocks S110, S120, S130 and S140.

In block S110, acquiring traffic demand samples.

The traffic demand sample includes a source address, a destination address, a flow interval, and a flow size.

In embodiments of the present disclosure, the traffic demand samples can be firstly acquired, in which the traffic demand sample includes a source address, a destination address, a flow interval, and a flow size, and each acquired traffic demand sample can be represented by a multi-dimensional vector as follows:

$$A=(src, dst, interval\ time, flow\ size)$$

where A represents the traffic demand sample, src represents the source address, dst represents the destination address.

In block S120, acquiring a first interval number by performing equal-frequency binning discretization processing according to the flow interval, and acquiring a second interval number by performing equal-frequency binning discretization processing according to the flow size.

The equal-frequency binning discretization processing refers to that the traffic demand samples are divided into equal-frequency intervals according to the flow interval and the flow size, to ensure that traffic demand sample data in each interval is the same. The first interval number may be a group of interval numbers acquired by dividing the traffic demand sample into equal-frequency intervals according to the flow interval, and the second interval number may be a group of interval numbers acquired by dividing the traffic demand sample into equal-frequency intervals according to the flow size.

In embodiments of the present disclosure, after the traffic demand samples are acquired, the equal-frequency binning discretization processing may be performed according to the flow interval and the flow size of the traffic demand samples, thereby acquiring the first interval number and the second interval number. For example, the equal-frequency binning discretization processing may be performed according to the flow interval of the traffic demand samples to acquire 100 intervals (also known as bins), and 100 intervals are acquired according to the flow size. In this example, the first interval number refers to a group of numbers ranging from 0 to 99, and the second interval number refers to a group of numbers also ranging from 0 to 99.

In block S130, determining a traffic demand subset according to the source address and the destination address, and acquiring a first parameter matrix and a second parameter matrix by training an LDA probability topic model according to the traffic demand subset.

The first parameter matrix is a high-dimensional feature probability distribution matrix from the source address to the destination address, and the second parameter matrix is a joint probability distribution matrix from a high-dimensional feature to the flow interval and the flow size.

In embodiments of the present disclosure, traffic demand samples can be divided into traffic demand subsets according to the source address and the destination address, and the LDA probability topic model may be trained according to the traffic demand subsets to acquire the first parameter matrix and the second parameter matrix. In other words, traffic demand samples in one traffic demand subset have the same source address and the same destination address, and are traffic demand samples sent from the same source address to the same destination address. The LDA probability topic model is trained according to the traffic demand subset to output the high-dimensional feature probability distribution matrix from the source address to the destination address and the joint probability distribution matrix from the high-dimensional feature to the flow interval and the flow size.

In block S140, the traffic demand data is generated according to the first interval number, the second interval number, the first parameter matrix, and the second parameter matrix.

In embodiments of the present disclosure, after acquiring the first interval number, the second interval number, the first parameter matrix and the second parameter matrix, the traffic demand data may be generated according to the first interval number, the second interval number, the first parameter matrix, and the second parameter matrix.

In the embodiments of the present disclosure, the traffic demand samples are acquired, in which the traffic demand sample includes the source address, the destination address, the flow interval, and the flow size. The equal-frequency binning discretization processing is performed according to the flow interval and the flow size to acquire the first interval number and the second interval number, the traffic demand subsets are determined according to the source address and the destination address, and the LDA probability topic model is trained according to the traffic demand subsets. The traffic demand data is generated according to the first interval number, the second interval number, the first parameter matrix, and the second parameter matrix. According to the present disclosure, the traffic demand data in the real data center service scenario can be generated.

In an embodiment, acquiring the traffic demand samples includes: acquiring packet-level traffic data; and acquiring the traffic demand samples by processing the packet-level traffic data according to the source address, the destination address and an inactivity timeout threshold.

In embodiments of the present disclosure, a way to acquire the traffic demand samples may be: acquiring the packet-level traffic data, and acquiring the traffic demand samples by processing the packet-level traffic data according to the source address, the destination address and the inactivity timeout threshold.

It should be noted that the inactivity timeout threshold is used to determine whether any two adjacent data packs are included in one flow. If an interval between arrival times of the two data packs is less than or equal to the inactivity timeout threshold, the two data packs belong to the same flow. If the interval is greater than the inactivity timeout threshold, it indicates that the later data pack initializes a new flow. The inactivity timeout threshold may be set as 60 seconds, or may be set to a longer time than a packet interval distribution in the packet-level traffic data.

In an embodiment, acquiring the first interval number by performing equal-frequency binning discretization processing according to the flow interval includes: acquiring a first queue of traffic demand samples by sorting the traffic demand samples according to the flow interval; acquiring a preset number of first sample intervals by performing equal-frequency division according to the first queue of traffic demand samples; and based on a first sample interval to which a flow interval belongs, converting the flow interval into the first interval number corresponding to the first sample interval.

The first queue of traffic demand samples may be a queue acquired by sorting traffic demand samples according to the flow interval, and the sorting may be performed in an ascending order or a descending order. The first sample interval may be an interval acquired by the equal-frequency division on the first queue of traffic demand samples.

In embodiments of the present disclosure, the traffic demand samples may be sorted according to the flow interval to acquire the first queue of traffic demand samples, and the equal-frequency division is performed according to the first queue of traffic demand samples, so as to acquire a preset number of first sample intervals, for example, 100 first sample intervals. Based on the first sample interval to which the flow interval belongs, the flow interval may be converted into the first interval number corresponding to the first sample interval. That is, the first interval number is an interval number acquired by processing the flow demand samples according to the flow interval.

In an embodiment, acquiring the second interval number by performing equal-frequency binning discretization processing according to the flow size includes: acquiring a second queue of traffic demand samples by sorting the traffic demand samples according to the flow size; acquiring a preset number of second sample intervals by performing equal-frequency division according to the second queue of traffic demand samples; and based on a second sample interval to which a flow size belongs, converting the flow size into the second interval number corresponding to the second sample interval.

The second queue of traffic demand samples may be a queue acquired by sorting traffic demand samples according to the flow size, and the sorting may be performed in an ascending order or a descending order. The second sample interval may be an interval acquired by the equal-frequency division on the second queue of traffic demand samples.

In embodiments of the present disclosure, the traffic demand samples may be sorted according to the flow size to acquire the second queue of traffic demand samples, and the equal-frequency division is performed according to the second queue of traffic demand samples, to acquire a preset number of second sample intervals, for example, 100 second sample intervals. Based on the second sample interval to which the flow size belongs, the flow size may be converted into the second interval number corresponding to the second sample interval. That is, the second interval number is an interval number acquired by processing the flow demand samples according to the flow size.

In an embodiment, determining the traffic demand subset according to the source address and the destination address includes: classifying the traffic demand samples having the same source address and the same destination address into one traffic demand subset; and deleting the traffic demand subset in case that the traffic demand subset only includes a single traffic demand sample.

In embodiments of the present disclosure, the traffic demand samples may be classified into the same traffic demand subset in case that the source addresses of these traffic demand samples are the same and the destination addresses of these traffic demand samples are the same. After the classification of the traffic demand subsets is completed, the number of the traffic demand samples included in each traffic demand subset may be determined. If a traffic demand subset only includes one traffic demand sample, the traffic demand subset should be deleted. That is, the traffic demand subset includes at least two traffic demand samples having the same source address and the same destination address.

In an embodiment, acquiring the first parameter matrix and the second parameter matrix by training the LDA probability topic model according to the traffic demand subset includes: acquiring a joint value of the flow interval and the flow size; constructing the LDA probability topic model according to the joint value; and acquiring the first parameter matrix and the second parameter matrix by training the LDA probability topic model.

In embodiments of the present disclosure, the flow demand subset can be used as a document of the LDA probability topic model, and the flow demand sample can be used as a word corresponding to the document. After the joint value of the flow interval and the flow size is acquired, and the joint value can be used as a word representation of the traffic demand sample in the document. The LDA probability topic model can be constructed according to the joint value used as the word representation, and the LDA probability topic model can be trained to acquire the first parameter matrix and the second parameter matrix.

In an embodiment, generating the traffic demand data according to the first interval number, the second interval number, the first parameter matrix, and the second parameter matrix includes: acquiring a high-dimensional feature type according to the first parameter matrix, the source address and the destination address; acquiring a joint interval number of the flow interval and the flow size according to the high-dimensional feature type and the second parameter matrix; acquiring real values corresponding to the flow interval and the flow size according to the joint interval number, the first interval number and the second interval number; and generating the traffic demand data according to the real values.

In embodiments of the present disclosure, the high-dimensional feature type may be acquired according to the first parameter matrix, the source address and the destination address, and the joint interval number of the flow interval and the flow size may be acquired according to the high-dimensional feature type and the second parameter matrix. The real values corresponding to the flow interval and the flow size may be acquired according to the joint interval number, the first interval number and the second interval number. For example, the joint interval number may be mapped back to the real value according to the first interval number and the second interval number. The traffic demand data may be generated according to the real values. In this way, the traffic demand data in the real data center service scenario can be acquired, and the real data center service scenario is constructed according to the acquired packet-level traffic data.

It should be noted that, the step of generating the traffic demand data may be repeatedly performed to iteratively generate the traffic demand data until a required amount of data is generated.

In an embodiment, acquiring the high-dimensional feature type according to the first parameter matrix, the source address and the destination address includes: based on the first parameter matrix, acquiring a first parameter vector according to the source address and the destination address; and based on a first polynomial distribution model, acquiring the high-dimensional feature type according to the first parameter vector. The first parameter vector is a parameter vector extracted from the first parameter matrix according to the source address and the destination address.

In embodiments of the present disclosure, the first parameter vector may be acquired according to the source address and the destination address and based on the first parameter matrix, and the high-dimensional feature type may be acquired according to the first parameter vector based on the first polynomial distribution model.

It should be noted that, the source address and the destination address may be randomly determined by traversing all the source addresses and destination addresses, and the first polynomial distribution model has a formula of:

$$z \sim Multinominal(\theta_r)$$

where z represents the high-dimensional feature type, and $\theta_r$ represents the first parameter vector.

In an embodiment, acquiring the joint interval number of the flow interval and the flow size according to the high-dimensional feature type and the second parameter matrix includes: based on the second parameter matrix, acquiring a second parameter vector according to the high-dimensional feature type; and based on a second polynomial distribution model, acquiring the joint interval number of the flow interval and the flow size according to the second parameter vector. The second parameter vector is a parameter vector extracted from the second parameter matrix according to the high-dimensional feature type.

In embodiments of the present disclosure, the second parameter vector may be acquired according to the high-dimensional feature type and based on the second parameter matrix, and the joint interval number of the flow interval and the flow size may be acquired according to the second parameter vector via the second polynomial distribution model.

It should be noted that, the second polynomial distribution model has a formula of:

$$\alpha \sim Multinominal(\beta_z)$$

where $\alpha$ represents the joint interval number, and $\beta_z$ represents the second parameter vector.

Figure 2:
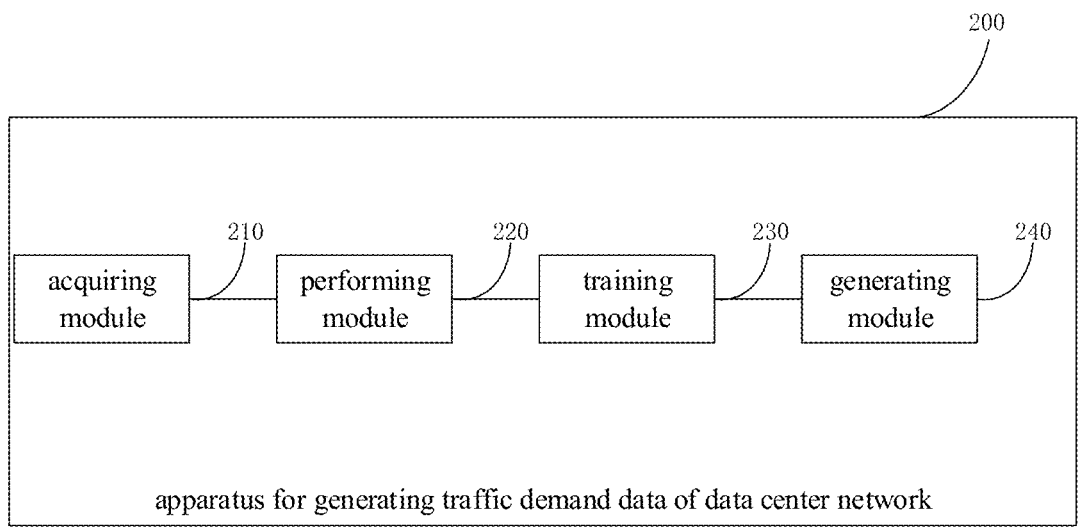
FIG. 2 is a block diagram illustrating an apparatus for generating traffic demand data of a data center network according to embodiments of the present disclosure.

In order to realize the above embodiments, as shown in FIG. 2, the present embodiment further provides an apparatus 200 for generating traffic demand data of a data center network, in which the apparatus 200 includes: an acquiring module 210 configured to acquire traffic demand samples, in which the traffic demand sample include a source address, a destination address, a flow interval and a flow size; a performing module 220 configured to acquire a first interval number by performing equal-frequency binning discretization processing according to the flow interval and acquire a second interval number by performing equal-frequency binning discretization processing according to the flow size, respectively; a training module 230 configured to determine a traffic demand subset according to the source address and the destination address, and acquire a first parameter matrix and a second parameter matrix by training an LDA probability topic model according to the traffic demand subset, in which the first parameter matrix is a high-dimensional feature probability distribution matrix from the source address to the destination address, and the second parameter matrix is a joint probability distribution matrix from a high-dimensional feature to the flow interval and the flow size; and a generating module 240 configured to generate the traffic demand data according to the first interval number, the second interval number, the first parameter matrix and the second parameter matrix.

In an embodiment, the acquiring module 210 includes: a first acquiring unit configured to acquire packet-level traffic data; and a processing unit configured to acquire the traffic demand samples by processing the packet-level traffic data according to the source address, the destination address and an inactivity timeout threshold.

In an embodiment, the performing module 220 includes: a first sorting unit configured to acquire a first queue of traffic demand samples by sorting the traffic demand samples according to the flow interval; a first dividing unit configured to acquire a preset number of first sample intervals by performing equal-frequency division according to the first queue of traffic demand samples; and a first converting unit configured to, based on a first sample interval to which a flow interval belongs, convert the flow interval into the first interval number corresponding to the first sample interval.

In an embodiment, the performing module 220 includes: a second sorting unit configured to acquire a second queue of traffic demand samples by sorting the traffic demand samples according to the flow size; a second dividing unit configured to acquire a preset number of second sample intervals by performing equal-frequency division according to the second queue of traffic demand samples; and a second converting unit configured to, based on a second sample interval to which a flow size belongs, convert the flow size into the second interval number corresponding to the second sample interval.

In an embodiment, the training module 230 includes: a classifying unit configured to classify the traffic demand samples having the same source address and the same destination address into one traffic demand subset; and a deleting unit configured to delete the traffic demand subset in case that the traffic demand subset only includes a single traffic demand sample.

In an embodiment, the training module 230 includes: a second acquiring unit configured to acquire a joint value of the flow interval and the flow size; a constructing unit configured to construct the LDA probability topic model according to the joint value; and a training unit configured to acquire the first parameter matrix and the second parameter matrix by training the LDA probability topic model.

In an embodiment, the generating module 240 includes: a third acquiring unit configured to acquire a high-dimensional feature type according to the first parameter matrix, the source address and the destination address; a fourth acquiring unit configured to acquire a joint interval number of the flow interval and the flow size according to the high-dimensional feature type and the second parameter matrix; a fifth acquiring unit configured to acquire real values corresponding to the flow interval and the flow size according to the joint interval number, the first interval number and the second interval number; and a generating unit configured to generate the traffic demand data according to the real values.

In an embodiment, the third acquiring unit includes: a first acquiring subunit configured to, based on the first parameter matrix, acquire a first parameter vector according to the source address and the destination address; and a second acquiring subunit configured to, based on a first polynomial distribution model, acquire the high-dimensional feature type according to the first parameter vector.

In an embodiment, the fourth acquiring unit includes: a third acquiring subunit configured to, based on the second parameter matrix, acquire a second parameter vector according to the high-dimensional feature type; and a fourth acquiring subunit configured to, based on a second polynomial distribution model, acquire the joint interval number of the flow interval and the flow size according to the second parameter vector.

According to the apparatus for generating traffic demand data of the data center network in the embodiments of the present disclosure, the traffic demand samples are acquired, in which the traffic demand sample include the source address, the destination address, the flow interval, and the flow size. The equal-frequency binning discretization processing is performed according to the flow interval and the flow size to acquire the first interval number and the second interval number, respectively. The traffic demand subset is determined according to the source address and the destination address, and the LDA probability topic model is trained according to the traffic demand subset. The traffic demand data is generated according to the first interval number, the second interval number, the first parameter matrix, and the second parameter matrix. According to the present disclosure, the traffic demand data in the real data center service scenario can be generated.

It should be noted that, details and explanations for the embodiments of the method for generating traffic demand data of the data center network are also applicable to the embodiments of the apparatus for generating traffic demand data of the data center network, and are not elaborated here.

The present disclosure provides in embodiments an electronic device including a processor; and a memory for storing instructions executable by the processor. The processor is configured to execute the instructions to perform the method as described above.

The present disclosure provides in embodiments a non-transitory computer-readable storage medium having stored therein computer programs that, when executed by a processor, cause operations of the method as described above.

It should be noted that various embodiments or examples described in the specification, as well as features of such the embodiments or examples, may be combined without conflict. Besides above examples, any other suitable combination should be regarded in the scope of the present disclosure.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which may not follow a shown or discussed order according to the related functions in a substantially simultaneous manner or in a reverse order, to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium. The storage medium mentioned above may be read-only memories, magnetic disks, CD, etc.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, "a plurality of" means two or more than two, unless specified otherwise.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for generating traffic demand data of a data center network, comprising:
    acquiring traffic demand samples, the traffic demand sample comprising a source address, a destination address, a flow interval, and a flow size;
    acquiring a first interval number by performing equal-frequency binning discretization processing according to the flow interval, and acquiring a second interval number by performing equal-frequency binning discretization processing according to the flow size;
    determining a traffic demand subset according to the source address and the destination address, and acquiring a first parameter matrix and a second parameter matrix by training a latent Dirichlet allocation (LDA) probability topic model according to the traffic demand subset, wherein the first parameter matrix is a high-dimensional feature probability distribution matrix from the source address to the destination address, and the second parameter matrix is a joint probability distribution matrix from a high-dimensional feature to the flow interval and the flow size; and
    generating the traffic demand data according to the first interval number, the second interval number, the first parameter matrix, and the second parameter matrix.

2. The method of claim 1, wherein acquiring the traffic demand samples comprises:
    acquiring packet-level traffic data; and
    acquiring the traffic demand samples by processing the packet-level traffic data according to the source address, the destination address and an inactivity timeout threshold.

3. The method of claim 1, wherein acquiring the first interval number by performing equal-frequency binning discretization processing according to the flow interval comprises:
    acquiring a first queue of traffic demand samples by sorting the traffic demand samples according to the flow interval;
    acquiring a preset number of first sample intervals by performing equal-frequency division according to the first queue of traffic demand samples; and
    based on a first sample interval to which a flow interval belongs, converting the flow interval into the first interval number corresponding to the first sample interval.

4. The method of claim 1, wherein acquiring the second interval number by performing equal-frequency binning discretization processing according to the flow size comprises:
    acquiring a second queue of traffic demand samples by sorting the traffic demand samples according to the flow size;
    acquiring a preset number of second sample intervals by performing equal-frequency division according to the second queue of traffic demand samples; and
    based on a second sample interval to which a flow size belongs, converting the flow size into the second interval number corresponding to the second sample interval.

5. The method of claim 1, wherein determining the traffic demand subset according to the source address and the destination address comprises:
    classifying the traffic demand samples having a same source address and a same destination address into one traffic demand subset; and
    deleting the traffic demand subset in case that the traffic demand subset only comprises a single traffic demand sample.

6. The method of claim 1, wherein acquiring the first parameter matrix and the second parameter matrix by training the LDA probability topic model according to the traffic demand subset comprises:
    acquiring a joint value of the flow interval and the flow size;
    constructing the LDA probability topic model according to the joint value; and
    acquiring the first parameter matrix and the second parameter matrix by training the LDA probability topic model.

7. The method of claim 1, wherein generating the traffic demand data according to the first interval number, the second interval number, the first parameter matrix, and the second parameter matrix comprises:
    acquiring a high-dimensional feature type according to the first parameter matrix, the source address and the destination address;
    acquiring a joint interval number of the flow interval and the flow size according to the high-dimensional feature type and the second parameter matrix;
    acquiring real values corresponding to the flow interval and the flow size according to the joint interval number, the first interval number and the second interval number; and
    generating the traffic demand data according to the real values.

8. The method of claim 7, wherein acquiring the high-dimensional feature type according to the first parameter matrix, the source address and the destination address comprises:
    based on the first parameter matrix, acquiring a first parameter vector according to the source address and the destination address; and
    based on a first polynomial distribution model, acquiring the high-dimensional feature type according to the first parameter vector.

9. The method of claim 8, wherein acquiring the joint interval number of the flow interval and the flow size according to the high-dimensional feature type and the second parameter matrix comprises:
    based on the second parameter matrix, acquiring a second parameter vector according to the high-dimensional feature type; and
    based on a second polynomial distribution model, acquiring the joint interval number of the flow interval and the flow size.

10. An electronic device, comprising:
a processor; and
a memory for storing instructions executable by the processor;
wherein the processor is configured to execute the instructions to perform the method according to claim 1.

11. The electronic device of claim 10, wherein the processor is configured to:
acquire packet-level traffic data; and
acquire the traffic demand samples by processing the packet-level traffic data according to the source address, the destination address and an inactivity timeout threshold.

12. The electronic device of claim 10, wherein the processor is configured to:
acquire a first queue of traffic demand samples by sorting the traffic demand samples according to the flow interval;
acquire a preset number of first sample intervals by performing equal-frequency division according to the first queue of traffic demand samples; and
based on a first sample interval to which a flow interval belongs, convert the flow interval into the first interval number corresponding to the first sample interval.

13. The electronic device of claim 10, wherein the processor is configured to:
acquire a second queue of traffic demand samples by sorting the traffic demand samples according to the flow size;
acquire a preset number of second sample intervals by performing equal-frequency division according to the second queue of traffic demand samples; and
based on a second sample interval to which a flow size belongs, convert the flow size into the second interval number corresponding to the second sample interval.

14. The electronic device of claim 10, wherein the processor is configured to:
classify the traffic demand samples having a same source address and a same destination address into one traffic demand subset; and
delete the traffic demand subset in case that the traffic demand subset only comprises a single traffic demand sample.

15. The electronic device of claim 10, wherein the processor is configured to:
acquire a joint value of the flow interval and the flow size;
construct the LDA probability topic model according to the joint value; and
acquire the first parameter matrix and the second parameter matrix by training the LDA probability topic model.

16. The electronic device of claim 10, wherein the processor is configured to:
acquire a high-dimensional feature type according to the first parameter matrix, the source address and the destination address;
acquire a joint interval number of the flow interval and the flow size according to the high-dimensional feature type and the second parameter matrix;
acquire real values corresponding to the flow interval and the flow size according to the joint interval number, the first interval number and the second interval number; and
generate the traffic demand data according to the real values.

17. The electronic device of claim 16, wherein the processor is configured to:
based on the first parameter matrix, acquire a first parameter vector according to the source address and the destination address; and
based on a first polynomial distribution model, acquire the high-dimensional feature type according to the first parameter vector.

18. The electronic device of claim 17, wherein the processor is configured to:
based on the second parameter matrix, acquire a second parameter vector according to the high-dimensional feature type; and
based on a second polynomial distribution model, acquire the joint interval number of the flow interval and the flow size.

19. A non-transitory computer-readable storage medium having stored therein computer programs that, when executed by a processor, cause operations of the method according to claim 1 to be implemented.

* * * * *